United States Patent
Andermann, Jr. et al.

(10) Patent No.: US 10,066,107 B2
(45) Date of Patent: Sep. 4, 2018

(54) PROCESS FOR IMPROVING THE RHEOLOGICAL PROPERTIES OF AN AQUEOUS DISPERSION

(71) Applicant: Solenis Technologies, L.P., Schaffhausen (CH)

(72) Inventors: Lawrence J. Andermann, Jr., New Castle, DE (US); Jeffrey H. Peltier, Chester, PA (US); Michael James Bluemle, New Castle, DE (US); Markus Broecher, Muehlheim an der Ruhr (DE)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 64 days.

(21) Appl. No.: 14/030,529

(22) Filed: Sep. 18, 2013

(65) Prior Publication Data

US 2014/0080945 A1    Mar. 20, 2014

Related U.S. Application Data

(60) Provisional application No. 61/702,783, filed on Sep. 19, 2012.

(51) Int. Cl.
| | |
|---|---|
| *C02F 1/52* | (2006.01) |
| *C08L 97/00* | (2006.01) |
| *C08L 1/10* | (2006.01) |
| *C08L 3/00* | (2006.01) |
| *C08L 5/00* | (2006.01) |
| *C08K 3/10* | (2018.01) |
| *C08L 1/28* | (2006.01) |
| *C08L 3/02* | (2006.01) |
| *C08L 5/02* | (2006.01) |
| *C02F 1/56* | (2006.01) |
| *C02F 103/10* | (2006.01) |

(52) U.S. Cl.
CPC ............ *C08L 97/00* (2013.01); *C02F 1/5245* (2013.01); *C02F 1/5263* (2013.01); *C02F 1/56* (2013.01); *C08K 3/10* (2013.01); *C08L 1/10* (2013.01); *C08L 1/286* (2013.01); *C08L 3/00* (2013.01); *C08L 3/02* (2013.01); *C08L 5/00* (2013.01); *C08L 5/02* (2013.01); *C02F 2103/10* (2013.01)

(58) Field of Classification Search
CPC .............................. C02F 1/5263; C08L 97/00
USPC ......................................... 524/27, 29, 37, 52
See application file for complete search history.

(56) References Cited

U.S. PATENT DOCUMENTS

| | | |
|---|---|---|
| 4,929,655 A | 5/1990 | Takeda |
| 5,229,277 A | 7/1993 | Day et al. |
| 5,837,776 A | 11/1998 | Selvarajan |
| 6,265,477 B1 | 7/2001 | Hurlock |
| 7,875,118 B2 | 1/2011 | Dymond et al. |
| 7,901,583 B2 | 3/2011 | McColl et al. |
| 2003/0232914 A1 | 12/2003 | Devonport |
| 2004/0034145 A1 | 2/2004 | Fischer |
| 2004/0046158 A1 | 3/2004 | Hubner |
| 2005/0194292 A1 | 9/2005 | Beetge et al. |
| 2007/0203290 A1 | 8/2007 | Bellmann |
| 2008/0171813 A1 | 7/2008 | Sprouts |
| 2009/0116908 A1 | 5/2009 | Dymond et al. |
| 2009/0189113 A1 | 7/2009 | Camperd et al. |
| 2010/0006510 A1 | 1/2010 | Dymond et al. |
| 2010/0273683 A1 | 10/2010 | Yang |

FOREIGN PATENT DOCUMENTS

| | | |
|---|---|---|
| WO | 2011023358 | 3/2011 |
| WO | WO 2011050440 A1 * | 5/2011 |
| WO | WO 2012148397 A1 * | 11/2012 |

OTHER PUBLICATIONS

Heitner, H. W., "Flocculating Agents," Kirk-Othmer Encyclopedia of Chemical Technology, vol. 11, 623-647, published online 2000.*
Written Opinion of the International Searching Authority dated Apr. 24, 2014 International Search Report for International Application No. PCT/US 13/60393.

* cited by examiner

*Primary Examiner* — Nicholas E Hill
(74) *Attorney, Agent, or Firm* — Lorenz & Kopf LLP

(57) ABSTRACT

A process for improving the rheological properties of an aqueous dispersion comprising adding a rheology modifier to the aqueous dispersion, and then adding a water soluble synthetic polymer flocculant to the aqueous dispersion. The rheology modifier may be selected from the group consisting of natural polymers, semi-natural polymers, synthetic materials and combinations thereof. The water soluble synthetic polymer flocculant may be selected from the group consisting of water soluble anionic polymers, cationic polymers, amphoteric polymers, nonionic polymers, and combinations thereof.

7 Claims, No Drawings

PROCESS FOR IMPROVING THE RHEOLOGICAL PROPERTIES OF AN AQUEOUS DISPERSION

CROSS REFERENCE TO RELATED APPLICATIONS

This application claims the benefit of U.S. Patent Application No. 61/702,783, filed Sep. 19, 2012. U.S. Patent Application No. 61/702,783 is incorporated herein in its entirety by reference.

BACKGROUND OF THE INVENTION

Field of the Invention

Processes for improving the rheological properties of an aqueous dispersion comprising adding an effective amount of a rheology modifier to the aqueous dispersion, typically in combination with a synthetic water-soluble polymer flocculant. The process is particularly applicable to mining operations.

The Related Art

In the production of valuable metals and minerals in mining, ore bodies are typically ground, dispersed in aqueous solutions, treated with agents, and subjected to various processing conditions (temperature, pH, pressure, shear rate). The intended result of the mining operation is to generate aqueous dispersions that will undergo isolation, separation, or purification of the valuable portion of the ore, whether it is a metal or mineral.

Aqueous dispersions that result from the subject mining operations are comprised of mixtures of water, solids, and other materials. Examples of the types of solids typically found in the aqueous dispersions from mineral operations include minerals, metals, metal oxides, metal sulfides, metal hydroxides, salts, organic matter, and other inorganic matter. Aqueous dispersions that are comprised of ores, concentrates, tailings and the like, which may contain particles that have morphologies that are not conducive for rapid sedimentation or pumping are of particular interest. The pumped concentrated aqueous dispersions may contain valuable minerals or metals or waste residues. Valuable resources found in the aqueous dispersions may include minerals (bauxites, latherites, or sulfides), metals (such as iron, base metals, precious metals, light metals, and uranium), coal and the like. The waste streams consist of gangue minerals and other constituents with little or no value. Typically, aqueous dispersions are processed by treatment with flocculating or coagulating agents to initiate liquid-solid separation that concentrates the solids portion of the aqueous dispersion in appropriate separation processes, e.g. centrifuging, concentrating, sedimentation, dewatering, filtering and the like.

Liquid-solid separations facilitated by the use of coagulating and/or flocculating agents are required to further concentrate the aqueous dispersions to reduce the process costs associated with transport, calcination, separation, digestion, or storage. Liquid-solid separations are now more challenging because ore bodies that are processed today contain lower concentrations of the valuable minerals and metals and higher concentration of gangue minerals. Gangue comprises that portion of ore bodies that is unusable or of low value, and gangue typically consists of fine particles of irregular shape. Liquid-solid separations are accelerated by the use of synthetic or natural polymers prior to transporting the aqueous dispersion from where it is found or generated to the facility where it is stored, calcined, separated, or transported. Due to the size and shape of the gangue particles, gangue minerals are more difficult to agglomerate; therefore, higher dosages of synthetic or natural polymer flocculants are required to achieve the same sedimentation rates necessary to maintain desired mill flow rates. What makes the transport of the concentrated aqueous dispersions even more challenging is that the chemicals used to coagulate or flocculate the solids of the aqueous dispersions promote higher rheological parameters, such as higher viscosity or higher yield stress for the concentrated solids and make the solids even more difficult to pump.

Use of high molecular weight, synthetic polymer flocculants imparts higher rheological characteristics making pumping of the aqueous dispersions more difficult, as a consequence operating cost and profitability are negatively impacted. Preferably, concentrated aqueous dispersions should exhibit low yield stresses to allow pumping at low threshold energy levels. Additionally, concentrated aqueous dispersions should possess low viscosities, which should result in fast flow rates through mining processes for improved efficiency, productivity, and lower energy costs at the mills or refineries. In order for mining companies to remain profitable, there is a need for mining operations to be able to process concentrated aqueous dispersions efficiently by reducing the rheological properties of the substrates.

All parts and percentages set forth herein are on a weight by weight basis unless otherwise specified. Mw is the weight average molecular weight as determined by SEC-MALLS analysis. MALLS shall mean and refer to multi-angular laser light scattering. SEC-MALLS shall mean and refer to a size exclusion chromatography technique using MALLS to determine Mw.

SUMMARY OF THE INVENTION

The invention pertains to a process for improving the rheological properties of an aqueous dispersion. The process comprises adding an effective amount of at least one rheology modifier to the aqueous dispersion. Typically, the rheology modifier is added to the aqueous system in combination with at least one synthetic water-soluble polymer flocculant, and in this case the rheology modifier is usually added prior to the flocculant.

The rheology modifier is selected from the group consisting of natural polymers, semi-natural polymers, synthetic materials and combinations thereof. Semi-natural polymers are chemically modified or synthetically modified natural polymers. The synthetic materials typically comprise cationic or anionic polymers or monomers.

The process may be applied in mining operations for improving the rheological properties of aqueous dispersions, such as mining slurries. For example, the process may be applied for liquid solid separation, such as in a gravity thickener, clarifier and/or hydrocyclone. Typically, the process is useful in operations involving mineral slurries comprising gold, phosphate, silver, platinum, copper, nickel, zinc, lead, molybdenum, iron, coal, aluminum (bauxite) and the like By using the defined process it was discovered that the yield stress of the aqueous dispersion was reduced. The reduction of the yield stress of the aqueous dispersion is important because aqueous slurries having a lower yield stress can be transported through pipelines and other equipment more rapidly and efficiently, which results in increased productivity and energy savings. In addition, the flocculation, sedimentation, and dewatering processes required for successful liquid-solid separation are accelerated through application of the process.

Yield stress means and refers to the amount of energy required to start a solids moving as measured by vane rheometry. Aspect ratio is defined by the ratio of the minimum to the maximum Feret diameter as measured by x-ray diffraction. The aspect ratio provides an indication of the elongation and sphericity of a particle, where the sphericity of the particle is inversely proportional to the aspect ratio.

DETAILED DESCRIPTION OF THE INVENTION

Among the natural polymers that can be used in the process are polysaccharides, such as potato starch, xanthan gums, guars, dextran, cellulose derivatives and glycosaminoglycans. Preferably, the natural polymer used in the subject invention comprises dextran. Typically used as the polysaccharide is a dextran having a Mw of from about 5,000 to about 40,000,000, preferably from about 50,000 to about 25,000,000 and more preferably from about 200,000 to about 10,000,000. Typically, the PDI of the polysaccharide is from about 1.0 to about 10.0, more typically from about 1.1 to about 9.0, and most typically from about 1.2 to about 8.0. Persons of ordinary skill in these arts, after reading this disclosure, will appreciate that all ranges and values within these explicitly stated ranges are contemplated. Natural polymers sold under the trade names ZALTA® VM 1120 and ZALTA® VM 1122, both available from Ashland. Inc., Wilmington, Del. USA ("Ashland"), may be used.

The semi-natural polymers include lignosulfonates, such as calcium lignosulfonate, and chemically modified polysaccharides. Modified polysaccharides typically useful in the process include modified starches, such as cationic starch; modified guar gum, such as cationic guar gum; and modified celluloses such as anionic carboxymethyl cellulose and hydroxyethyl cellulose. Combinations of semi-natural polymers may be used.

The synthetic material is typically selected from the group consisting of cationic inorganic polymer, cationic inorganic molecule, cationic organic polymer, anionic organic polymer, and the like, and combinations thereof. A cationic inorganic polymer useful in the process is polyaluminum chloride. Cationic inorganic molecules include those selected from the group consisting of aluminum sulfate, aluminum chloride, polyaluminum chloride, aluminum chlorohydrate, ferric chloride, ferric sulfate, ferrous sulfate and sodium aluminate and the like, and combinations thereof. Cationic organic polymer useful in the invention include polymers formed from the monomers diallyl dimethyl ammonium chloride, ethylene imine, comonomers of epichlorohydrin and dimethylamine, cationically-modified tannins, melamine formaldehyde, and the like and combinations thereof. For example, the cationic organic polymer may be polydimethyldiallylammonium chloride (poly (DADMAC)). The anionic organic polymer may comprise polyacrylate.

Water-soluble synthetic polymer flocculants that can be used in the process comprise water-soluble anionic, cationic, nonionic polymers, and amphoteric polymers. For purpose of this disclosure, water-soluble synthetic polymer shall include copolymers and terpolymers, as well as homopolymers. Typically the water-soluble synthetic polymer used has a Mw of from about 500,000 to about 25,000,000, preferably from about 750,000 to about 20,000,000, and more preferably from about 1,000,000 to about 18,000,000. The water-soluble synthetic polymers may be linear, branched, or cross-linked. Persons of ordinary skill in these arts, after reading this disclosure, will appreciate that all ranges and values within these explicitly stated ranges are contemplated.

Nonionic polymers include polymers formed from one or more water-soluble ethylenically unsaturated nonionic monomers, for instance acrylamide, methacrylamide, hydroxyethyl acrylate and N-vinylpyrrolidone, preferably acrylamide. Nonionic polymers also include alkoxylated multifunctional alcohols.

Cationic polymers are formed from one or more ethylenically unsaturated cationic monomers optionally with one or more of the nonionic monomers mentioned previously. The cationic polymer may also be amphoteric provided that there are predominantly more cationic groups than anionic groups. The cationic monomers include dialkylamino alkyl (meth)acrylates, dialkylamino alkyl(meth)acrylamides, and diallyl dimethyl ammonium chloride, including acid addition and quaternary ammonium salts thereof. Typical cationic monomers include the methyl chloride quaternary ammonium salts of dimethylamino ethyl acrylate and dimethyl aminoethyl methacrylate. Of particular interest are the copolymer of acrylamide with the methyl chloride quaternary ammonium salts of dimethylamino ethyl acrylate (ADAME); the copolymer of acrylamide and acrylamidopropyl trimethyl ammonium chloride (APTAC); and the copolymer of acrylamide and acryloyloxyethyl trimethyl ammonium chloride (AETAC); and the copolymer of epichlorohydrin and dimethylamine.

Anionic polymers are formed from one or more ethylenically unsaturated anionic monomers or a blend of one or more anionic monomers with one or more of the nonionic monomers mentioned previously. The anionic monomers include acrylic acid, methacrylic acid, maleic acid, crotonic acid, itaconic acid, vinyl sulfonic acid, allyl sulfonic acid, 2-acrylamido-2-methylpropane sulfonic acid (AMPS), acrylamide, mixtures thereof, and salts thereof.

Of particular interest are copolymers and/or terpolymers of monomers selected from the group consisting of acrylamide, 2-acrylamido 2-methylpropane sulfonic acid (AMPS), acrylic acid, and (meth)acrylic acid. For example, the anionic polymer may be selected from the group consisting of copolymers derived from 2-acrylamido 2-methylpropane sulfonic acid, copolymers of acrylic acid and acrylamide, homopolymers of acrylic acid, homopolymers of acrylamide, and combinations thereof. Typically used as anionic polymer are the copolymer of sodium acrylate and acrylamide and the copolymer of acrylic acid and acrylamide.

Also of particular interest are copolymers of AMPS and acrylamide wherein the mole percent of AMPS is from about 10 mole percent to about 25 mole percent, and terpolymers of AMPS, acrylamide, and acrylic acid wherein the mole percent of AMPS is from about 10 mole percent to about 30 mole percent, the mole percent of acrylamide is from about 40 mole percent to about 60 mole percent, and the mole percent of acrylic acid is from about 20 mole percent to about 40 mole percent. Otherwise, homopolymers of acrylic acid or copolymers of acrylic acid and acrylamide are of particular interest.

The water-soluble synthetic polymer can be prepared by polymerization of a water soluble monomer or water soluble monomer blend according to methods well known in the art. The water soluble monomers typically are water soluble monomers or water soluble monomer blend having a solubility in water of at least 5 g in 100 ml of water.

Typically the rheology modifier is added to the aqueous dispersion prior to the water-soluble synthetic polymer flocculant. In an embodiment, the invention concerns a process comprising the steps of a) adding an effective amount of at least one rheology modifier selected from the group consisting of natural polymers, semi-natural polymers, synthetic materials and combinations thereof to an aqueous dispersion and b) then in a separate step adding at least one water-soluble synthetic polymer flocculant selected from the group consisting of inorganic polymer, cationic inorganic molecule, cationic organic polymer, anionic organic polymer and combinations thereof. The amount of rheology modifier and water soluble synthetic polymer flocculant effective to promote lower rheological properties such as yield stress or viscosity and accelerate flocculation, sedimentation and the dewatering process for effective solid/liquid separation will be dependent on the characteristic properties of the selected rheology modifier and water-soluble synthetic polymer flocculant, the morphology of the particles in the aqueous dispersion, and the concentration of the aqueous dispersion during liquid-solid separation. The weight ratio of rheology modifier to water soluble synthetic polymer flocculant is a ratio that effectively reduces the yield stress of the aqueous dispersion, which generally is a ratio is from about 4:1 to about 1:4, and typically ranges from about 0.10:1.0 to about 2.0:1.0, preferably from about 0.20:1.0 to about 1.0:1.0, and more preferably from about 0.25:1.0 to about 0.75:1.0. The total amount of rheology modifier and water soluble synthetic polymer flocculant used to treat the aqueous system varies over wide ranges but typically ranges from about 1.0 to about 1000 grams per metric ton of aqueous system treated, preferably from about 2.0 to about 800 grams per metric ton, and more preferably from about 10.0 to about 600 grams per metric ton. Persons of ordinary skill in these arts, after reading this disclosure, will appreciate that all ranges and values within these explicitly stated ranges are contemplated.

The total solids found in the aqueous dispersion can vary over wide ranges, but typically ranges from about 25 g/liter to about 2,000 g/liter, such as about 50 g/liter to about 2,000 g/liter. The process is particularly useful in reducing the yield stress of the aqueous dispersion where the aspect ratio of the solids is less than about 1.0, more particularly when the aspect ratio is less than about 0.5, and/or the solids if the aqueous dispersion contains a substantial amount of gangue. Persons of ordinary skill in these arts, after reading this disclosure, will appreciate that all ranges and values within these explicitly stated ranges are contemplated.

In particular the method may be applied in a unit operation within in a mining operation, such as for a liquid-solid separation unit, for example a conventional clarifier or thickener vessel as a model piece of equipment, although the process is applicable for any typical liquid-solid separation unit operation. Regarding the order of addition, or sequence of treatment, the rheology modifiers were found to be most effective when applied to the aqueous dispersion prior to the application of the water-soluble synthetic polymer flocculant, as opposed to treating the substrate with both the rheology modifier and water-soluble synthetic polymer flocculant simultaneously, or treating the substrate with the rheology modifier after the addition of the water-soluble synthetic polymer flocculant. With respect to, for example, conventional clarifier or thickener vessel or other type of liquid-solid separation equipment the water-soluble synthetic polymer flocculant is typically used to treat the substrate, i.e. the aqueous dispersion, within the conventional clarifier or thickener vessel to facilitate the concentration and dewatering of the aqueous dispersion of the substrate. Thus, in the processes of the invention the water-soluble synthetic polymer flocculant is preferably added into the center feed well of the clarifier or thickener vessel where the substrate first enters the clarifier or thickener vessel from the feed pipe. The water-soluble synthetic polymer flocculant may be fed through a port into the feed pipe at a point close to the thickener vessel feed well or may be fed at multiple points, i.e., into the feed well and through the feed pipe at points close to the feed well. In these embodiments, the rheology modifier is added into the feed pipe, or other unit operation leading to the feed pipe, prior to the introduction of the water-soluble synthetic polymer flocculant to the substrate in the conventional clarifier or thickener vessels or other liquid-solid separation equipment or apparatus. The net effect of feeding the rheology modifier prior to the water-soluble synthetic polymer flocculant is to pre-treat or condition the surface of the substrate before it interacts with the flocculant.

The rheology modifier may be applied in the absence of the water-soluble synthetic polymer flocculant in embodiments where the desired effects can be achieved without the properties associated with the water soluble synthetic polymer flocculant, such as where dewatering is not an issue. For example, direct injection into a pipeline feed of concentrated slurry to reduce yield stress. In this embodiment, the process typically comprises the step of adding an effective amount of at least one rheology modifier to an aqueous dispersion. The rheology modifier in this process is typically selected from the group consisting of natural polymers, semi-natural polymers, synthetic materials and combinations thereof.

EXAMPLES

In the examples, unless otherwise noted, the reagents used in the examples are those set forth in Table 1.

TABLE I

| | | | | Reagents | | | |
|---|---|---|---|---|---|---|---|
| Reagent | Product | Class | Type | Charge | MW Range | Functionality | Full Product Trade Name |
| Rheology Modifier A | Zalta ™ VM1120 | natural | organic | non-ionic | med MW | poly-saccharide | Ashland ZaltaTM VM1120 |
| Rheology Modifier B | Zalta ™ VM1122 | natural | organic | non-ionic | med MW | poly-saccharide | Ashland ZaltaTM VM1122 |
| Rheology Modifier C | USB dextran 5-40M | natural | organic | non-ionic | med MW | poly-saccharide | USB dextran 5-40M |
| Rheology Modifier D | USB dextran <15K | natural | organic | non-ionic | low MW | poly-saccharide | USB dextan <15K |
| Rheology Modifier E | Ambergum ™ 3021 | semi-natural | organic | anionic | low MW | carboxymethyl-cellulose | Ashland Ambergum ™ 3021 Water-Soluble Polymers |
| Rheology Modifier F | Norlig A | semi-natural | organic | anionic | low MW | calcium lignosulfonate | Borregaard Norlig A Calcium Lignosulfonate |

TABLE I-continued

Reagents

| Reagent | Product | Class | Type | Charge | MW Range | Functionality | Full Product Trade Name |
|---|---|---|---|---|---|---|---|
| Rheology Modifier G | Carbose D-65 | semi-natural | organic | anionic | low MW | carboxymethyl-cellulose | Penn Carbose D-65 |
| Rheology Modifier H | Carbose LT-30 | semi-natural | organic | anionic | low MW | carboxymethyl-cellulose | Penn Carbose LT-30 |
| Rheology Modifier I | Carbose M-72 | semi-natural | organic | anionic | low MW | carboxymethyl-cellulose | Penn Carbose M-72 |
| Rheology Modifier J | N-Hance ™ 3196 | semi-natural | organic | cationic | low MW | cationic guar gum | Ashland N-Hance ™ 3196 Guar Gum |
| Rheology Modifier K | N-Hance ™ 3215 | semi-natural | organic | cationic | low MW | cationic guar gum | Ashland N-Hance ™ 3215 Cationic guar |
| Rheology Modifier L | N-Hance ™ BF13 | semi-natural | organic | cationic | low MW | cationic guar gum | Ashland N-Hance ™ BF13 Cationic guar |
| Rheology Modifier M | N-Hance ™ BF17 | semi-natural | organic | cationic | low MW | cationic guar gum | Ashland N-Hance ™ BF17 Cationic Guar Derivatives |
| Rheology Modifier W | StaLok 400 | semi-natural | organic | cationic | med MW | cationic starch | Tate & Lyle/A. E. Staley StaLok 400 |
| Rheology Modifier X | StaLok 410 | semi-natural | organic | cationic | med MW | cationic starch | Tate & Lyle/A. E. Staley StaLok 410 |
| Rheology Modifier Y | StaLok 430 | semi-natural | organic | cationic | med MW | cationic starch | Tate & Lyle/A. E. Staley StaLok 430 |
| Rheology Modifier N | Good-Rite K-752 | synthetic | organic | anionic | low MW | polyacrylate | B. F. Goodrich Good-Rite K-752 |
| Rheology Modifier O | Praestol ™ 187 K | synthetic | organic | cationic | low MW | coagulant | Ashland Praestol ™ 187 K FLOCCULANT |
| Rheology Modifier P | Praestol ™ 193 K | synthetic | organic | cationic | low MW | coagulant | Ashland Praestol ™ 193 K FLOCCULANT |
| Rheology Modifier Q | Amersep ™ 5320 | synthetic | inorganic | cationic | low MW | coagulant | Ashland Amersep ™ 5320 NEUTRALIZING AGENT |
| Rheology Modifier R | Chargepac ™ 6 | synthetic | inorganic | cationic | low MW | coagulant | Ashland Chargepac ™ 6 COAGULANT |
| Rheology Modifier S | Chargepac ™ 7 | synthetic | inorganic | cationic | low MW | coagulant | Ashland Chargepac ™ 7 COAGULANT |
| Rheology Modifier T | Chargepac ™ 10 | synthetic | inorganic | cationic | low MW | coagulant | Ashland Chargepac ™ 10 COAGULANT |
| Rheology Modifier U | Chargepac ™ 16 | synthetic | inorganic | cationic | low MW | coagulant | Ashland Chargepac ™ 16 COAGULANT |
| Rheology Modifier V | Chargepac ™ 60 | synthetic | inorganic | cationic | low MW | coagulant | Ashland Chargepac ™ 60 COAGULANT |
| Flocculant A | Praestol ™ 2530 | synthetic | organic | anionic | high MW | anionic polyacrylamide | Ashland Praestol ™ 2530 FLOCCULANT |
| Flocculant B | Praestol ™ 2640 | synthetic | organic | anionic | high MW | anionic polyacrylamide | Ashland Praestol ™ 2640 FLOCCULANT |
| Flocculant C | Praestol ™ A 4040 L | synthetic | organic | anionic | high MW | anionic polyacrylamide | Ashland Praestol ™ A 4040 L FLOCCULANT |
| Flocculant D | Praestol ™ A 24587 | synthetic | organic | anionic | high MW | anionic polyacrylamide | Ashland Praestol ™ A 24587 |
| Flocculant E | Flopaam AL 80 EH | synthetic | organic | anionic | high MW | anionic polyacrylamide | SNF AL80EH |
| Flocculant F | Flopaam AN 113 SH | synthetic | organic | anionic | high MW | anionic polyacrylamide | SNF Flopaam AN 113 SH |

Unless otherwise indicated, the yield stress of the tested aqueous dispersion was determined by adding 1000 mL of an aqueous dispersion to a graduated cylinder, where first the rheology modifier(s) were added to the aqueous dispersion, tamping the rheology modifier(s) into the dispersion three times with a plunger having perforated holes. Then, the water-soluble synthetic polymer flocculant was added to the aqueous dispersion using the same mixing technique and number of tamps.

The rate at which the liquid-solid separation occurred was established by starting a timer at the point where the liquid-solid interface reached the 1000 milliliter mark in the graduated cylinder and then recording the time at which the liquid-solid interface reached each additional 50 milliliters down to the 700 milliliter mark. The sedimentation rate was calculated by subtracting the time recorded at the 900 milliliter mark from the time recorded at the 700 milliliter mark.

A compaction value was recorded after 18 hours. The subsequent measurements of yield stress were taken after the 24 hour mark. To prepare the samples for analysis the liquid was siphoned out of the 1000 milliliter graduated cylinders until there were only concentrated solids left in the cylinders. The resulting slurries were quantitatively transferred into appropriately sized beakers. The slurries in the beakers were allowed to rest for an additional 4 hours prior to conducting the yield stress measurements.

The yield stress (in Pa) was measured with a Brookfield HBDVIII Ultra rheometer or Brookfield RVDVIII Ultra rheometer using vane spindles. The tested aqueous dispersion was placed in an appropriately sized beaker for the vane spindle used. The selection of the spindle or rheometer depended on the magnitude of range of yield stress measured. The vane spindle was lowered down into the aqueous dispersion to the vane spindle's primary mark. RHEO-CALC® software was used to calculate the yield stress utilizing either the Bingham model or the Casson model where noted.

Examples 1.II-D to 30.II-D

In Examples 1.II-D to 30.II-D, as set forth in Table II-D, gold ore feed concentrate was treated with the rheology modifiers and water-soluble synthetic polymer flocculants set forth in Table II-D in the ratios and dosages set forth in the table. The treated aqueous dispersions were analyzed for sedimentation, compaction and change in yield stress in accordance with the procedures set forth above. The properties and results are set forth in Table II-D.

TABLE II-D

Treatment of Gold Ore Filter Feed Concentrate
Examples of Present Invention - Semi-natural Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 1 | Rheology Modifier E | N/A | Flocculant F | 0% | 50% | 128.9 | 15.5 | 1.1300 | 32 | 270 | −8% |
| 2 | Rheology Modifier E | N/A | Flocculant F | 0% | 100% | 128.9 | 15.5 | 1.1300 | 21 | 270 | −16% |
| 3 | Rheology Modifier E | N/A | Flocculant F | 0% | 75% | 128.9 | 15.5 | 1.1300 | 28 | 270 | −25% |
| 4 | Rheology Modifier E | N/A | Flocculant F | 0% | 50% | 128.9 | 15.5 | 1.1300 | 17 | 270 | −30% |
| 5 | Rheology Modifier E | N/A | Flocculant F | 0% | 100% | 129.7 | 15.5 | 1.1231 | 23 | 285 | −39% |
| 6 | Rheology Modifier E | N/A | Flocculant F | 0% | 50% | 129.7 | 15.5 | 1.1231 | 24 | 280 | −96% |
| 8 | Rheology Modifier G | N/A | Flocculant F | 0% | 100% | 128.9 | 15.5 | 1.1300 | 22 | 290 | −5% |
| 9 | Rheology Modifier G | N/A | Flocculant F | 0% | 50% | 128.9 | 15.5 | 1.1300 | 25 | 275 | −10% |
| 10 | Rheology Modifier G | N/A | Flocculant F | 0% | 100% | 128.9 | 15.5 | 1.1300 | 23 | 290 | −17% |
| 11 | Rheology Modifier G | N/A | Flocculant F | 0% | 50% | 129.7 | 15.5 | 1.1231 | 22 | 285 | −39% |
| 12 | Rheology Modifier G | N/A | Flocculant F | 0% | 50% | 129.7 | 15.5 | 1.1231 | 22 | 295 | −41% |
| 13 | Rheology Modifier H | N/A | Flocculant F | 0% | 50% | 129.7 | 15.5 | 1.1231 | 19 | 280 | −3% |
| 14 | Rheology Modifier H | N/A | Flocculant F | 0% | 50% | 129.7 | 15.5 | 1.1231 | 23 | 285 | −67% |
| 15 | Rheology Modifier I | N/A | Flocculant F | 0% | 50% | 129.7 | 15.5 | 1.1231 | 21 | 285 | −10% |
| 16 | Rheology Modifier I | N/A | Flocculant F | 0% | 100% | 129.7 | 15.5 | 1.1231 | 23 | 300 | −84% |
| 17 | Rheology Modifier K | N/A | Flocculant F | 0% | 100% | 144.0 | 18.5 | 1.1291 | 15 | N/A | −4% |
| 18 | Rheology Modifier K | N/A | Flocculant F | 0% | 50% | 112.8 | 17.8 | 1.1231 | 13 | N/A | −13% |
| 19 | Rheology Modifier K | N/A | Flocculant F | 0% | 25% | 112.8 | 17.8 | 1.1231 | 13 | N/A | −19% |
| 20 | Rheology Modifier K | N/A | Flocculant F | 0% | 50% | 112.8 | 17.8 | 1.1231 | 15 | N/A | −20% |
| 21 | Rheology Modifier K | N/A | Flocculant F | 0% | 50% | 144.0 | 18.5 | 1.1291 | 12 | N/A | −21% |
| 22 | Rheology Modifier K | N/A | Flocculant F | 0% | 75% | 112.8 | 17.8 | 1.1231 | 14 | N/A | −22% |
| 23 | Rheology Modifier K | N/A | Flocculant F | 0% | 75% | 144.0 | 18.5 | 1.1291 | 17 | N/A | −23% |
| 24 | Rheology Modifier K | N/A | Flocculant F | 0% | 75% | 112.8 | 17.8 | 1.1231 | 21 | N/A | −38% |
| 25 | Rheology Modifier M | N/A | Flocculant F | 0% | 75% | 112.8 | 17.8 | 1.1231 | 16 | N/A | −23% |
| 26 | Rheology Modifier M | N/A | Flocculant F | 0% | 75% | 112.8 | 17.8 | 1.1231 | 16 | N/A | −31% |
| 27 | Rheology Modifier M | N/A | Flocculant F | 0% | 25% | 112.8 | 17.8 | 1.1231 | 11 | N/A | −34% |
| 28 | Rheology Modifier M | N/A | Flocculant F | 0% | 50% | 112.8 | 17.8 | 1.1231 | 18 | N/A | −44% |
| 29 | Rheology Modifier M | N/A | Flocculant F | 0% | 100% | 112.8 | 17.8 | 1.1231 | 20 | N/A | −44% |
| 30 | Rheology Modifier M | N/A | Flocculant F | 0% | 50% | 112.8 | 17.8 | 1.1231 | 15 | N/A | −47% |

Examples 1.II-E to 16.II-E

In Examples 1.II-E to 16.II-E, as set forth in Table II-E, gold ore feed concentrate was treated with the rheology modifiers and water-soluble synthetic polymer flocculants set forth in Table II-E in the ratios and dosages set forth in the table. The treated aqueous dispersions were analyzed for sedimentation, compaction and change in yield stress in accordance with the procedures set forth above. The properties and results are set forth in Table II-E.

TABLE II-E

Treatment of Gold Ore Filter Feed Concentrate
Examples of Present Invention - Synthetic Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 1 | Rheology Modifier Q | N/A | Flocculant F | 0% | 25% | 110.5 | 18.2 | 1.1219 | 1 | N/A | −6% |
| 2 | Rheology Modifier Q | N/A | Flocculant F | 0% | 50% | 110.5 | 18.2 | 1.1219 | 2 | N/A | −47% |
| 3 | Rheology Modifier T | N/A | Flocculant F | 0% | 50% | 110.5 | 18.2 | 1.1219 | 2 | N/A | −8% |
| 4 | Rheology Modifier U | N/A | Flocculant F | 0% | 50% | 110.5 | 18.2 | 1.1219 | 3 | N/A | −5% |
| 5 | Rheology Modifier U | N/A | Flocculant F | 0% | 25% | 110.5 | 18.2 | 1.1219 | 3 | N/A | −7% |
| 6 | Rheology Modifier R | N/A | Flocculant F | 0% | 50% | 110.5 | 18.2 | 1.1219 | 2 | N/A | −6% |
| 7 | Rheology Modifier R | N/A | Flocculant F | 0% | 100% | 110.5 | 18.2 | 1.1219 | 2 | N/A | −19% |
| 8 | Rheology Modifier V | N/A | Flocculant F | 0% | 100% | 110.5 | 18.2 | 1.1219 | 1 | N/A | −25% |
| 9 | Rheology Modifier S | N/A | Flocculant F | 0% | 100% | 110.5 | 18.2 | 1.1219 | 2 | N/A | −17% |
| 10 | Rheology Modifier S | N/A | Flocculant F | 0% | 50% | 110.5 | 18.2 | 1.1219 | 2 | N/A | −19% |
| 11 | Rheology Modifier S | N/A | Flocculant F | 0% | 25% | 110.5 | 18.2 | 1.1219 | 2 | N/A | −42% |
| 12 | Rheology Modifier N | N/A | Flocculant F | 0% | 100% | 128.9 | 15.5 | 1.1300 | 27 | 260 | −15% |
| 13 | Rheology Modifier N | N/A | Flocculant F | 0% | 75% | 128.9 | 15.5 | 1.1300 | 27 | 260 | −20% |
| 14 | Rheology Modifier N | N/A | Flocculant F | 0% | 50% | 128.9 | 15.5 | 1.1300 | 21 | 270 | −29% |
| 15 | Rheology Modifier O | N/A | Flocculant F | 0% | 25% | 110.5 | 18.2 | 1.1219 | 2 | N/A | −3% |
| 16 | Rheology Modifier P | N/A | Flocculant F | 0% | 25% | 110.5 | 18.2 | 1.1219 | 1 | N/A | −10% |

Examples 1.II-F to 28.II-F

In Examples 1.II-F to 28.II-F, as set forth in Table II-F, gold ore feed concentrate was treated with the rheology modifiers and water-soluble synthetic polymer flocculants set forth in Table II-F in the ratios and dosages set forth in the table. The treated aqueous dispersions were analyzed for sedimentation, compaction and change in yield stress in accordance with the procedures set forth above. The properties and results are set forth in Table II-F.

TABLE II-F

Treatment of Gold Ore Filter Feed Concentrate
Examples of Present Invention -Combinations of Natural and Semi-natural or Synthetic Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 1 | Rheology Modifier A | Rheology Modifier E | Flocculant F | 100% | 50% | 129.7 | 15.5 | 1.1231 | 27 | 280 | −11% |
| 2 | Rheology Modifier A | Rheology Modifier G | Flocculant F | 100% | 100% | 129.7 | 15.5 | 1.1231 | 21 | 290 | −86% |
| 3 | Rheology Modifier A | Rheology Modifier G | Flocculant F | 100% | 50% | 129.7 | 15.5 | 1.1231 | 27 | 280 | −95% |
| 4 | Rheology Modifier A | Rheology Modifier H | Flocculant F | 100% | 50% | 129.7 | 15.5 | 1.1231 | 29 | 280 | −50% |
| 5 | Rheology Modifier A | Rheology Modifier H | Flocculant F | 100% | 100% | 129.7 | 15.5 | 1.1231 | 21 | 285 | −64% |
| 6 | Rheology Modifier A | Rheology Modifier H | Flocculant F | 100% | 50% | 129.7 | 15.5 | 1.1231 | 21 | 285 | −75% |
| 7 | Rheology Modifier A | Rheology Modifier I | Flocculant F | 100% | 50% | 129.7 | 15.5 | 1.1231 | 20 | 285 | −95% |
| 8 | Rheology Modifier A | Rheology Modifier I | Flocculant F | 100% | 100% | 129.7 | 15.5 | 1.1231 | 18 | 300 | −100% |
| 9 | Rheology Modifier A | Rheology Modifier K | Flocculant F | 100% | 25% | 112.8 | 17.8 | 1.1231 | 11 | N/A | −7% |
| 10 | Rheology Modifier A | Rheology Modifier K | Flocculant F | 100% | 75% | 113.2 | 17.6 | 1.1271 | 13 | N/A | −16% |
| 11 | Rheology Modifier A | Rheology Modifier K | Flocculant F | 100% | 75% | 113.2 | 17.6 | 1.1271 | 9 | N/A | −18% |
| 12 | Rheology Modifier A | Rheology Modifier K | Flocculant F | 100% | 50% | 113.2 | 17.6 | 1.1271 | 13 | N/A | −19% |
| 13 | Rheology Modifier A | Rheology Modifier K | Flocculant F | 100% | 50% | 112.8 | 17.8 | 1.1231 | 21 | N/A | −24% |
| 14 | Rheology Modifier A | Rheology Modifier K | Flocculant F | 100% | 50% | 112.8 | 17.8 | 11231 | 6 | N/A | −25% |
| 15 | Rheology Modifier A | Rheology Modifier K | Flocculant F | 100% | 100% | 112.8 | 17.8 | 1.1231 | 19 | N/A | −28% |
| 16 | Rheology Modifier A | Rheology Modifier K | Flocculant F | 100% | 75% | 112.8 | 17.8 | 1.1231 | 13 | N/A | −29% |
| 17 | Rheology Modifier A | Rheology Modifier L | Flocculant F | 100% | 100% | 113.2 | 17.6 | 1.1271 | 15 | N/A | −5% |
| 18 | Rheology Modifier A | Rheology Modifier L | Flocculant F | 100% | 50% | 113.2 | 17.6 | 1.1271 | 11 | N/A | −9% |
| 19 | Rheology Modifier A | Rheology Modifier L | Flocculant F | 100% | 50% | 113.2 | 17.6 | 1.1271 | 11 | N/A | −12% |
| 20 | Rheology Modifier A | Rheology Modifier M | Flocculant F | 100% | 100% | 112.8 | 17.8 | 1.1231 | 17 | N/A | −3% |
| 21 | Rheology Modifier A | Rheology Modifier M | Flocculant F | 100% | 75% | 113.2 | 17.6 | 1.1271 | 16 | N/A | −3% |
| 22 | Rheology Modifier A | Rheology Modifier M | Flocculant F | 100% | 100% | 113.2 | 17.6 | 1.1271 | 15 | N/A | −14% |
| 23 | Rheology Modifier A | Rheology Modifier M | Flocculant F | 100% | 75% | 112.8 | 17.8 | 1.1231 | 21 | N/A | −15% |
| 24 | Rheology Modifier A | Rheology Modifier M | Flocculant F | 100% | 25% | 112.8 | 17.8 | 1.1231 | 11 | N/A | −29% |
| 25 | Rheology Modifier A | Rheology Modifier Q | Flocculant F | 100% | 100% | 144.0 | 18.5 | 1.1291 | 13 | N/A | −12% |
| 26 | Rheology Modifier A | Rheology Modifier Q | Flocculant F | 100% | 50% | 144.0 | 18.5 | 1.1291 | 17 | N/A | −14% |
| 27 | Rheology Modifier A | Rheology Modifier Q | Flocculant F | 100% | 75% | 144.0 | 18.5 | 1.1291 | 12 | N/A | −22% |
| 28 | Rheology Modifier A | Rheology Modifier S | Flocculant F | 100% | 75% | 144.0 | 18.5 | 1.1291 | 14 | N/A | −4% |

Examples 1.II-G to 4.II-G

In Examples 1.II-G to 4.II-G, as set forth in Table II-G, gold ore feed concentrate was treated with the rheology modifiers and water-soluble synthetic polymer flocculants set forth in Table II-G in the ratios and dosages set forth in the table. The treated aqueous dispersions were analyzed for sedimentation, compaction and change in yield stress in accordance with the procedures set forth above. The properties and results are set forth in Table II-G.

Examples 1.III-D to 32.III-D

In Examples 1.III-D to 32.III-D, as set forth in Table III-D, phosphate ore slurry was treated with the rheology modifiers and water-soluble synthetic polymer flocculants set forth in Table III-D in the ratios and dosages set forth in the table. The treated aqueous dispersions were analyzed for sedimentation, compaction and change in yield stress in accordance with the procedures set forth above. The properties and results are set forth in Table III-D.

TABLE II-G

Treatment of Gold Ore Filter Feed Concentrate
Examples of Present Invention - Combinations of Semi-natural and Synthetic Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate 24 h (m/h) | Compaction 24 h (mL) | Change in Yield Stress (from Blank) |
|---|---|---|---|---|---|---|---|---|---|---|---|
| 1 | Rheology Modifier K | Rheology Modifier Q | Flocculant F | 100% | 75% | 144.0 | 18.5 | 1.1291 | 12 | N/A | −6% |
| 2 | Rheology Modifier K | Rheology Modifier Q | Flocculant F | 100% | 100% | 144.0 | 18.5 | 1.1291 | 14 | N/A | −21% |
| 3 | Rheology Modifier K | Rheology Modifier S | Flocculant F | 100% | 75% | 144.0 | 18.5 | 1.1291 | 9 | N/A | −7% |
| 4 | Rheology Modifier K | Rheology Modifier V | Flocculant F | 100% | 50% | 144.0 | 18.5 | 1.1291 | 15 | N/A | −4% |

Examples 1.III-C to 7.III-C

In Examples 1.III-C to 7.III-C, as set forth in Table III-C, phosphate ore slurry was treated with the rheology modifiers and water-soluble synthetic polymer flocculants set forth in Table III-C in the ratios and dosages set forth in the table. The treated aqueous dispersions were analyzed for sedimentation, compaction and change in yield stress in accordance with the procedures set forth above. The properties and results are set forth in Table III-C.

Examples 1.III-E to 7.III-E

In Examples 1.III-E to 32.III-E, as set forth in Table III-E, phosphate ore slurry was treated with the rheology modifiers and water-soluble synthetic polymer flocculants set forth in Table III-E in the ratios and dosages set forth in the table. The treated aqueous dispersions were analyzed for sedimentation, compaction and change in yield stress in accordance with the procedures set forth above. The properties and results are set forth in Table III-E.

TABLE III-C

Treatment of Phosphate Ore Slurry
Examples of Present Invention - Semi-natural Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 1 | N/A | Rheology Modifier J | Flocculant B | N/A | 75% | 10.9 | 20.3 | 1.1266 | 21.2 | N/A | −10% |
| 2 | N/A | Rheology Modifier J | Flocculant B | N/A | 25% | 10.9 | 20.3 | 1.1266 | 18.7 | N/A | −31% |
| 3 | N/A | Rheology Modifier K | Flocculant B | N/A | 50% | 12.3 | 18.4 | 1.1120 | 17.4 | N/A | −1% |
| 4 | N/A | Rheology Modifier K | Flocculant B | N/A | 75% | 12.3 | 18.4 | 1.1120 | 15.9 | N/A | −18% |
| 5 | N/A | Rheology Modifier L | Flocculant B | N/A | 75% | 14.5 | 15.8 | 1.0862 | 17.6 | N/A | −21% |
| 6 | N/A | Rheology Modifier M | Flocculant B | N/A | 25% | 14.0 | 16.2 | 1.0963 | 14.8 | N/A | −5% |
| 7 | N/A | Rheology Modifier M | Flocculant B | N/A | 50% | 14.0 | 16.2 | 1.0963 | 17.6 | N/A | −6% |

TABLE III-D

Treatment of Phosphate Ore Slurry
Examples of Present Invention - Combinations of Natural and Semi-natural Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 1 | Rheology Modifier A | Rheology Modifier K | Flocculant F | 100% | 100% | 54.0 | 10.5 | 1.9800 | N/A | N/A | −5% |
| 2 | Rheology Modifier A | Rheology Modifier K | Flocculant F | 100% | 50% | 54.0 | 10.5 | 1.9800 | N/A | N/A | −9% |
| 3 | Rheology Modifier A | Rheology Modifier K | Flocculant F | 100% | 75% | 50.6 | 19.5 | 1.1405 | 15.9 | 220 | −12% |
| 4 | Rheology Modifier A | Rheology Modifier L | Flocculant F | 100% | 150% | 50.6 | 19.5 | 1.1405 | 42.4 | 210 | −40% |
| 5 | Rheology Modifier A | Rheology Modifier L | Flocculant F | 100% | 75% | 50.6 | 19.5 | 1.1405 | 22.6 | 220 | −65% |
| 6 | Rheology Modifier A | Rheology Modifier M | Flocculant F | 100% | 75% | 50.6 | 19.5 | 1.1405 | 17.6 | 210 | −23% |
| 7 | Rheology Modifier A | Rheology Modifier M | Flocculant C | 200% | 30% | 50.5 | 11.7 | 1.0563 | N/A | 210 | −1% |
| 8 | Rheology Modifier A | Rheology Modifier M | Flocculant C | 400% | 25% | 50.5 | 11.7 | 1.0563 | N/A | 220 | −3% |
| 9 | Rheology Modifier A | Rheology Modifier J | Flocculant B | 317% | 50% | 10.9 | 20.3 | 1.1266 | 23.4 | N/A | −2% |
| 10 | Rheology Modifier A | Rheology Modifier J | Flocculant B | 295% | 75% | 10.9 | 20.3 | 1.1266 | 20.2 | N/A | −5% |
| 11 | Rheology Modifier A | Rheology Modifier J | Flocculant B | 100% | 50% | 10.9 | 20.3 | 1.1266 | 27.4 | N/A | −6% |
| 12 | Rheology Modifier A | Rheology Modifier J | Flocculant B | 32% | 25% | 10.9 | 20.3 | 1.1266 | 21.2 | N/A | −10% |
| 13 | Rheology Modifier A | Rheology Modifier J | Flocculant B | 317% | 25% | 10.9 | 20.3 | 1.1266 | 21.2 | N/A | −15% |
| 14 | Rheology Modifier A | Rheology Modifier J | Flocculant B | 32% | 25% | 10.9 | 20.3 | 1.1266 | 13.2 | N/A | −17% |
| 15 | Rheology Modifier A | Rheology Modifier K | Flocculant B | 32% | 50% | 12.3 | 18.4 | 1.1120 | 21.0 | N/A | −9% |
| 16 | Rheology Modifier A | Rheology Modifier M | Flocculant B | N/A | 25% | 14.0 | 16.2 | 1.0963 | 20.9 | N/A | 0% |
| 17 | Rheology Modifier A | Rheology Modifier M | Flocculant B | 295% | 75% | 14.0 | 16.2 | 1.0963 | 17.6 | N/A | −1% |
| 18 | Rheology Modifier A | Rheology Modifier M | Flocculant B | 100% | 25% | 14.0 | 16.2 | 1.0963 | 13.8 | N/A | −2% |
| 19 | Rheology Modifier A | Rheology Modifier M | Flocculant B | 34% | 75% | 14.0 | 16.2 | 1.0963 | 21.2 | N/A | −2% |
| 20 | Rheology Modifier A | Rheology Modifier M | Flocculant B | 317% | 50% | 14.0 | 16.2 | 1.0963 | 21.2 | N/A | −10% |
| 21 | Rheology Modifier A | Rheology Modifier M | Flocculant B | 32% | 25% | 14.0 | 16.2 | 1.0963 | 16.7 | N/A | −11% |
| 22 | Rheology Modifier A | Rheology Modifier M | Flocculant B | 100% | 50% | 14.0 | 16.2 | 1.0963 | 21.2 | N/A | −12% |

TABLE III-D-continued

Treatment of Phosphate Ore Slurry
Examples of Present Invention - Combinations of Natural and Semi-natural Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 23 | Rheology Modifier A | Rheology Modifier M | Flocculant B | 317% | 25% | 14.0 | 16.2 | 1.0963 | 14.3 | N/A | −14% |
| 24 | Rheology Modifier A | Rheology Modifier M | Flocculant B | 100% | 76% | 14.0 | 16.2 | 1.0963 | 15.9 | N/A | −14% |
| 25 | Rheology Modifier A | Rheology Modifier M | Flocculant B | 100% | 25% | 14.0 | 16.2 | 1.0963 | 12.4 | N/A | −17% |
| 26 | Rheology Modifier A | Rheology Modifier M | Flocculant B | 317% | 25% | 14.0 | 16.2 | 1.0963 | 17.6 | N/A | −27% |
| 27 | Rheology Modifier A | Rheology Modifier W | Flocculant B | 50% | 19% | 80.8 | 11.7 | 1.0563 | N/A | 220 | −5% |
| 28 | Rheology Modifier A | Rheology Modifier W | Flocculant B | 100% | 25% | 80.8 | 11.7 | 1.0563 | N/A | 230 | −10% |
| 29 | Rheology Modifier A | Rheology Modifier X | Flocculant B | 50% | 19% | 80.8 | 11.7 | 1.0563 | N/A | 210 | −9% |
| 30 | Rheology Modifier A | Rheology Modifier X | Flocculant B | 100% | 25% | 80.8 | 11.7 | 1.0563 | N/A | 205 | −16% |
| 31 | Rheology Modifier A | Rheology Modifier Y | Flocculant B | 50% | 19% | 80.8 | 11.7 | 1.0563 | N/A | 240 | 0% |
| 32 | Rheology Modifier A | Rheology Modifier Y | Flocculant B | 100% | 25% | 80.8 | 11.7 | 1.0563 | N/A | 265 | −11% |

TABLE III-E

Treatment of Phosphate Ore Slurry
Examples of Present Invention - Combinations of Semi-natural and Natural Rheology Modifiers with Synthetic Flocculants

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| | Rheology Modifier F | N/A | Flocculant C | 0% | 25% | 146.3 | 4.3 | 1.0055 | N/A | 100 | −9% |
| | Rheology Modifier F | Rheology Modifier A | Flocculant C | 200% | 30% | 146.3 | 4.3 | 1.0055 | N/A | 90 | −12% |
| | Rheology Modifier F | Rheology Modifier A | Flocculant C | 200% | 60% | 146.3 | 4.3 | 1.0055 | N/A | 100 | −21% |
| | Rheology Modifier F | Rheology Modifier A | Flocculant C | 400% | 25% | 146.3 | 4.3 | 1.0055 | N/A | 90 | −22% |
| | Rheology Modifier F | Rheology Modifier A | Flocculant C | 100% | 40% | 146.3 | 4.3 | 1.0055 | N/A | 90 | −35% |
| | Rheology Modifier M | Rheology Modifier A | Flocculant C | 200% | 30% | 50.5 | 11.7 | 1.0563 | N/A | 185 | −3% |
| | Rheology Modifier M | Rheology Modifier A | Flocculant C | 400% | 25% | 50.5 | 11.7 | 1.0563 | N/A | 190 | −5% |

Examples 1.IV to 10.IV

In Examples 1.IV to 10.IV, as set forth in Table IV, bauxite residuals were treated with the rheology modifiers and water-soluble synthetic polymer flocculants set forth in Table IV in the ratios and dosages set forth in the table. The treated aqueous dispersions were analyzed for sedimentation, compaction and change in yield stress in accordance with the procedures set forth above. The properties and results are set forth in Table IV.

TABLE IV

Treatment of Bauxite Residuals

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 1 | Rheology Modifier D | Rheology Modifier C | Flocculant E | 500% | 50% | 20.6 | 35.4 | 1.37 | 16 | 160 | −68% |
| 2 | Rheology Modifier D | Rheology Modifier A | Flocculant E | 500% | 50% | 20.6 | 35.4 | 1.37 | 10 | 155 | −78% |

TABLE IV-continued

Treatment of Bauxite Residuals

| Examples | Reagent 1 | Reagent 2 | Reagent 3 | Ratio Reagent 2:Reagent 1 | Ratio Reagents 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| 3 | Rheology Modifier A | Rheology Modifier C | Flocculant E | 500% | 50% | 20.6 | 35.4 | 1.37 | 21 | 165 | −91% |
| 4 | Rheology Modifier A | Rheology Modifier K | Flocculant E | 33% | 100% | 10.3 | 35.4 | 1.37 | 26 | 180 | −11% |
| 5 | Rheology Modifier A | Rheology Modifier K | Flocculant E | 300% | 50% | 20.6 | 35.4 | 1.37 | 20 | 155 | −51% |
| 6 | Rheology Modifier A | Rheology Modifier K | Flocculant E | 1100% | 50% | 20.6 | 35.4 | 1.37 | 18 | 170 | −57% |
| 7 | Rheology Modifier A | Rheology Modifier K | Flocculant E | 500% | 50% | 20.6 | 35.4 | 1.37 | 18 | 155 | −57% |
| 8 | Rheology Modifier A | Rheology Modifier K | Flocculant E | 1100% | 50% | 20.6 | 35.4 | 1.37 | 28 | 165 | −57% |
| 9 | Rheology Modifier A | Rheology Modifier K | Flocculant E | 500% | 50% | 20.6 | 35.4 | 1.37 | 28 | 165 | −59% |
| 10 | Rheology Modifier A | Rheology Modifier K | Flocculant E | 300% | 50% | 20.6 | 35.4 | 1.37 | 17 | 165 | −69% |

Examples 1.V to 10.V

In Examples 1.V to 10.V, as set forth in Table V, copper tailings were treated with the rheology modifiers and water soluble synthetic polymer flocculants set forth in Table V in the ratios and dosages set forth in the table. The treated aqueous dispersions were analyzed for sedimentation, compaction and change in yield stress in accordance with the procedures set forth above. The properties and results are set forth in Table V.

TABLE V

Treatment of Copper Tailings

| Examples | Reagent 1 | Reagent 2 | Reagent 3 | Ratio Reagent 2:Reagent 1 | Ratio Reagent 1 & 2:Reagent 3 | Reagent 3 Dose (g/t) | Feed Solids (%) | Pulp Density (t/m3) | Sedimentation Rate (m/h) | Compaction 24 h (mL) | Change in Yield Stress (from Blank) |
|---|---|---|---|---|---|---|---|---|---|---|---|
| A | N/A | N/A | Flocculant B | N/A | | 27.8 | 12.7 | 1.067 | 10 | 218 | 0% |
| B | Rheology Modifier A | N/A | Flocculant B | 0% | 25% | 29.5 | 12.0 | 1.060 | 14 | 200 | 1% |
| 1 | Rheology Modifier A | Rheology Modifier K | Flocculant B | 100% | 51% | 26.9 | 12.9 | 1.080 | N/A | 210 | −4% |
| 2 | Rheology Modifier A | Rheology Modifier K | Flocculant B | 100% | 25% | 26.9 | 12.9 | 1.080 | 47 | 210 | −5% |
| 3 | Rheology Modifier A | Rheology Modifier M | Flocculant B | 280% | 25% | 30.1 | 11.8 | 1.061 | 14 | 210 | −4% |
| 4 | Rheology Modifier A | Rheology Modifier M | Flocculant B | 34% | 50% | 30.1 | 11.8 | 1.061 | 10 | 220 | −5% |
| 5 | Rheology Modifier A | Rheology Modifier W | Flocculant B | 280% | 25% | 25.4 | 13.7 | 1.074 | 14 | 225 | −5% |
| 6 | Rheology Modifier A | Rheology Modifier X | Flocculant B | 100% | 51% | 26.2 | 13.4 | 1.072 | 11 | 245 | −2% |
| 7 | Rheology Modifier A | Rheology Modifier X | Flocculant B | 280% | 25% | 26.2 | 13.4 | 1.072 | 9 | 225 | −3% |
| 8 | Rheology Modifier A | Rheology Modifier X | Flocculant B | 36% | 25% | 26.2 | 13.4 | 1.072 | 11 | 235 | −3% |
| 9 | Rheology Modifier A | Rheology Modifier X | Flocculant B | 34% | 50% | 26.2 | 13.4 | 1.072 | 13 | 240 | −6% |
| 10 | Rheology Modifier A | Rheology Modifier X | Flocculant B | 33% | 75% | 26.2 | 13.4 | 1.072 | 10 | 245 | −9% |

Example 33

DREWFLOC® 270 and ZALTA VM 1122, both from Ashland, were added to gold ore slurry in ratios of ZALTA VM 1122 to DREWFLOC 270 of 1:1, 2:1, 3:1 and 4:1. This was dosed into separate slurries in amounts of 54 grams/ton of slurry (0.12 pounds/ton), 82 grams/ton of slurry (0.18 pounds/ton) and 109 grams/ton of slurry (0.24 pounds/ton). Yield stresses were measured for each slurry as well as controls (no natural polymer used). The results are set forth in Table VI.

TABLE VI

Yield Stress (dyne/cm²)

| Ratio of Natural Polymer to Flocculant | Dosage (g/ton of slurry) | | |
|---|---|---|---|
| | 54 | 82 | 109 |
| Control (0) | 1474 | 2281 | 2662 |
| 1:1 | 1156 | 2588 | 3140 |
| 2:1 | 1936 | 2393 | 2672 |
| 3:1 | 1721 | 2343 | 2295 |
| 4:1 | 2263 | 2547 | 2944 |

The slurry dosed at 54 grams/ton of slurry showed reduction in yield stress compared to the control at a ratio of 1:1. The slurry dosed at 109 grams/ton of slurry showed decrease in yield stress at a ratio of 3:1.

Compaction (solids content) was measured for each slurry as well as controls (no natural polymer used). The results are set forth in Table VII.

TABLE VII

Compaction (% Solids)

| Ratio of Natural Polymer to Flocculant | Dosage (grams/ton of slurry) | | |
|---|---|---|---|
| | 54 | 82 | 109 |
| Control (0) | 48.68 | 48.04 | 48.89 |
| 1:1 | 48.38 | 48.78 | 48.89 |
| 2:1 | 48.38 | 48.16 | 49.23 |
| 3:1 | 47.88 | 48.62 | 51.67 |
| 4:1 | 47.76 | 48.76 | 48.88 |

With dosage at 109 grams/ton of slurry, there was increase in compaction, solids content, with a peak at the ratio of 3:1, which correlates with the peak reduction in yield stress for this dosage at the 3:1 ratio. It is noted, however, that application of the rheology modifier and flocculant will be process and process condition dependent in that the higher solids in the evaluated gold ore process shifted the total dosage to the higher levels to achieve optimal efficacy, whereas lower feed solids may shift the total dosage requirements to achieve higher efficacy in rheology and increase in compaction to a lower overall dosage.

We claim:

1. A process for reducing the yield stress of a mineral slurry comprising adding to the mineral slurry a rheology modifier followed by adding at least one water-soluble synthetic polymer flocculant;
   wherein the rheology modifier is a natural polymer;
   wherein the weight ratio of the rheology modifier to flocculant is from about 4:1 to about 1:4 and the total amount of rheology modifier and flocculant is from about 1.0 to about 1,000 grams per metric ton of mineral slurry treated; and
   wherein the total solids of the aqueous dispersion prior to addition of the rheology modifier and flocculant is from about 25 q/liter to about 2,000 q/liter;
   wherein the natural polymer is a polysaccharide; and
   wherein the rheology modifier and flocculant are added in an amount effective to reduce the yield stress of the mineral slurry by at least 25%.

2. A process for improving the rheological properties of a mineral slurry comprising
   (a) adding at least one rheology modifier to the mineral slurry, wherein the rheology modifier is a natural polymer having a molecular weight of from about 5,000 to about 40,000,000; and
   (b) then adding at least one water-soluble synthetic polymer flocculant having a weight average molecular weight of from about 500,000 to about 25,000,000 to the mineral slurry, and wherein the water-soluble synthetic polymer flocculant is selected from the group consisting of water-soluble anionic polymer, cationic polymer, amphoteric polymer, nonionic polymer, and combinations thereof;
   wherein the weight ratio of the rheology modifier to flocculant is from about 4:1 to about 1:4 and the total amount of rheology modifier and flocculant is from about 1.0 to about 1,000 grams per metric ton of mineral slurry treated; and wherein the total solids of the mineral slurry prior to addition of the rheology modifier and flocculant is from about 25 g/liter to about 2,000 g/liter;
   wherein the natural polymer is a polysaccharide;
   wherein the mineral slurry comprises a mineral selected from the group consisting of gold, phosphate, silver, platinum, copper, nickel, zinc, lead, molybdenum, iron, coal and aluminum; and
   wherein the yield stress of the mineral slurry is reduced by at least 25%.

3. The process of claim 1 wherein the polysaccharide is selected from the group consisting of potato starch, xanthan gum, guar, dextran, cellulose derivatives and glycosaminoglycan.

4. The process of claim 2 wherein the synthetic polymer flocculant is an anionic polymer comprising polyacrylate.

5. The process of claim 2 wherein the anionic polymer comprises a monomer selected from the group consisting of acrylic acid, methacrylic acid, maleic acid, crotonic acid, itaconic acid, vinyl sulfonic acid, allyl sulfonic acid, 2-acrylamido-2-methylpropane sulfonic acid, acrylamide and salts thereof.

6. The process of claim 2 wherein the flocculant is a cationic polymer comprising a monomer selected from the group consisting of dialkylamino alkyl (meth) acrylate, acid addition salts of dialkylamino alkyl (meth) acrylate, quaternary ammonium salts of dialkylamino alkyl (meth) acrylate, dialkylamino alkyl (meth) acrylamide, acid addition salts of dialkylamino alkyl (meth) acrylamide, quaternary ammonium salts of dialkylamino alkyl (meth) acrylamide, diallyl dimethyl ammonium chloride, acid addition salts of diallyl dimethyl ammonium chloride and quaternary ammonium salts of diallyl dimethyl ammonium chloride.

7. The process of claim 2 wherein the flocculant is a nonionic polymer comprising a monomer selected from the group consisting of acrylamide, methacrylamide, hydroxyethyl acrylate and N-vinylpyrrolidone.

* * * * *